United States Patent
Sharifi et al.

(10) Patent No.: US 11,688,392 B2
(45) Date of Patent: Jun. 27, 2023

(54) FREEZE WORDS

(71) Applicant: Google LLC, Mountain View, CA (US)

(72) Inventors: Matthew Sharifi, Kilchberg (CH); Aleksandar Kracun, New York, NY (US)

(73) Assignee: Google LLC, Mountain View, CA (US)

( * ) Notice: Subject to any disclaimer, the term of this patent is extended or adjusted under 35 U.S.C. 154(b) by 219 days.

(21) Appl. No.: 17/115,742

(22) Filed: Dec. 8, 2020

(65) Prior Publication Data

US 2022/0180862 A1 Jun. 9, 2022

(51) Int. Cl.
G10L 15/16 (2006.01)
G10L 15/05 (2013.01)
G10L 15/08 (2006.01)

(52) U.S. Cl.
CPC .............. *G10L 15/16* (2013.01); *G10L 15/05* (2013.01); *G10L 2015/088* (2013.01)

(58) Field of Classification Search
CPC ......... G10L 15/04; G10L 15/16; G10L 17/16; G10L 15/14; G10L 15/26; G10L 25/78; G10L 2015/223; G10L 2015/088; G10L 15/22; G10L 25/84; G10L 15/18; G10L 15/06
See application file for complete search history.

(56) References Cited

U.S. PATENT DOCUMENTS

| | | | |
|---|---|---|---|
| 10,679,621 B1 * | 6/2020 | Sundaram | H04W 4/12 |
| 11,437,043 B1 * | 9/2022 | Peng | G10L 17/18 |
| 2004/0225650 A1 | 11/2004 | Cooper et al. | |
| 2013/0275899 A1 * | 10/2013 | Schubert | B60K 35/00 715/765 |
| 2014/0163978 A1 * | 6/2014 | Basye | G10L 15/28 704/233 |
| 2017/0069309 A1 * | 3/2017 | Aleksic | G10L 15/22 |
| 2019/0122692 A1 * | 4/2019 | Binder | G10L 15/26 |
| 2019/0378499 A1 * | 12/2019 | Miller | G06F 3/167 |

(Continued)

FOREIGN PATENT DOCUMENTS

WO 2019071723 A1 4/2019

OTHER PUBLICATIONS

International Search Report and Written Opinion for the related Application No. PCT/US2021/059775, dated Apr. 25, 2022, 22 pages.

*Primary Examiner* — Vijay B Chawan
(74) *Attorney, Agent, or Firm* — Hontgman LLP; Brett A. Krueger; Grant Griffith

(57) ABSTRACT

A method for detecting freeze words includes receiving audio data that corresponds to an utterance spoken by a user and captured by a user device associated with the user. The method also includes processing, using a speech recognizer, the audio data to determine that the utterance includes a query for a digital assistant to perform an operation. The speech recognizer is configured to trigger endpointing of the utterance after a predetermined duration of non-speech in the audio data. Before the predetermined duration of non-speech, the method includes detecting a freeze word in the audio data. In response to detecting the freeze word in the audio data, the method also includes triggering a hard microphone closing event at the user device. The hard microphone closing event prevents the user device from capturing any audio subsequent to the freeze word.

28 Claims, 6 Drawing Sheets

(56) References Cited

U.S. PATENT DOCUMENTS

| | | | |
|---|---|---|---|
| 2020/0260186 A1* | 8/2020 | Stachura | H04R 5/04 |
| 2020/0335091 A1* | 10/2020 | Chang | G10L 15/22 |
| 2021/0306751 A1* | 9/2021 | Roach | H04R 1/1041 |
| 2022/0180862 A1* | 6/2022 | Sharifi | G10L 15/22 |

* cited by examiner

FREEZE WORDS

TECHNICAL FIELD

This disclosure relates to freeze words.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR.

SUMMARY

One aspect of the disclosure provides a method for detecting freeze words. The method includes receiving, at data processing hardware, audio data that corresponds to an utterance spoken by a user and captured by a user device associated with the user. The method also includes processing, by the data processing hardware, using a speech recognizer, the audio data to determine that the utterance includes a query for a digital assistant to perform an operation. The speech recognizer is configured to trigger endpointing of the utterance after a predetermined duration of non-speech in the audio data. Before the predetermined duration of non-speech in the audio data, the method includes detecting, by the data processing hardware, a freeze word in the audio data. The freeze word follows the query in the utterance spoken by the user and captured by the user device. In response to detecting the freeze word in the audio data, the method includes triggering, by the data processing hardware, a hard microphone closing event at the user device to prevent the user device from capturing any audio subsequent to the freeze word.

Implementations of the disclosure may include one or more of the following optional features. In some implementations, the freeze word includes one of a predefined freeze word that includes one or more fixed terms across all users in a given language, a user-selected freeze word that includes one or more terms specified by the user of the user device, or an action-specific freeze word associated with the operation to be performed by the digital assistant. In some examples, detecting the freeze word in the audio data includes: extracting audio features from the audio data; generating, using a freeze word detection model, a freeze word confidence score by processing the extracted audio features; the freeze word detection model executing on the data processing hardware; and determining that the audio data corresponding to the utterance includes the freeze word when the freeze word confidence score satisfies a freeze word confidence threshold.

Detecting the freeze word in the audio data may include recognizing, using the speech recognizer that executes on the data processing hardware, the freeze word in the audio data. Optionally, the method may further include, in response to detecting the freeze word in the audio data: instructing, by the data processing hardware, the speech recognizer to cease any active processing on the audio data; and instructing, by the data processing hardware, the digital assistant to fulfill performance of the operation.

In some implementations, processing the audio data to determine that the utterance includes the query for the digital assistant to perform the operation includes: processing, using the speech recognizer, the audio data to generate a speech recognition result for the audio data; and performing semantic interpretation on the speech recognition result for the audio data to determine that the audio data includes the query to perform the operation. In these implementations, in response to detecting the freeze word in the audio data, the method also includes: modifying, by the data processing hardware, the speech recognition result for the audio data by stripping the freeze word from the speech recognition result; and instructing, by the data processing hardware, using the modified speech recognition result, the digital assistant to perform the operation requested by the query.

In some examples, prior to processing the audio data using the speech recognizer, the method further includes: detecting, by the data processing hardware, using a hotword detection model, a hotword in the audio data that precedes the query; and in response to detecting the hotword, triggering, by the data processing hardware, the speech recognizer to process the audio data by performing speech recognition on the hotword and/or one or more terms following the hotword in the audio data. In these examples, the method may also include verifying, by the data processing hardware, a presence of the hotword detected by the hotword detection model based on detecting the freeze word in the audio data. Optionally, detecting the freeze word in the audio data may include executing a freeze word detection model on the data processing hardware that is configured to detect the freeze word in the audio data without performing speech recognition on the audio data. Here, the freeze word detection model and the hotword detection model may each include the same or different neural network-based models.

Another aspect of the disclosure provides a method for detecting freeze words. The method includes receiving, at data processing hardware, a first instance of audio data that corresponds to a dictation-based query for a digital assistant to dictate audible contents spoken by a user. The dictation-based query is spoken by the user and captured by an assistant-enabled device associated with the user. The method also includes receiving, at the data processing hardware, a second instance of the audio data that corresponds to an utterance of the audible contents spoken by the user and captured by the assistant-enabled device. The method also includes processing, by the data processing hardware, using a speech recognizer, the second instance of the audio data to generate a transcription of the audible contents. During the processing of the second instance of the audio data, the method includes detecting, by the data processing hardware, a freeze word in the second instance of the audio data. The freeze word follows the audible contents in the utterance spoken by the user and captured by the assistant-enabled device. In response to detecting the freeze word in the second instance of the audio data, the method includes providing, by the data processing hardware, the transcription of the audible contents spoken by the user for output from the assistant-enabled device.

Implementations of the disclosure may include one or more of the following optional features. In some implementations, in response to detecting the freeze word in the second instance of the audio data, the method further includes: initiating, by the data processing hardware, a hard microphone closing event at the assistant-enabled device to prevent the assistant-enabled device from capturing any audio subsequent to the freeze word; ceasing, by the data processing hardware, any active processing on the second instance of the audio data; and prior to providing the transcription of the audible contents for output from the assistant-enabled device, stripping, by the data processing hardware, the freeze word from and end of the transcription.

Optionally, the method may further include: processing, by the data processing hardware, using the speech recognizer, the first instance of the audio data to generate a speech recognition result; and performing, by the data processing hardware, semantic interpretation on the speech recognition result for the first instance of the audio data to determine that the first instance of the audio data includes the dictation-based query to dictate the audible contents spoken by the user. In some examples, prior to initiating processing on the second instance of the audio data to generate the transcription, the method also includes: determining, by the data processing hardware, that the dictation-based query specifies the freeze word based on the semantic interpretation performed on the speech recognition result for the first instance of the audio data; and instructing, by the data processing hardware, an endpointer to increase an endpointing timeout duration for endpointing the utterance of the audible contents.

Another aspect of the disclosure provides a system for detecting freeze words. The system includes data processing hardware and memory hardware storing instructions that when executed on the data processing hardware cause the data processing hardware to perform operations. The operations include receiving audio data that corresponds to an utterance spoken by a user and captured by a user device associated with the user. The operations also include processing, using a speech recognizer, the audio data to determine that the utterance includes a query for a digital assistant to perform an operation. The speech recognizer is configured to trigger endpointing of the utterance after a predetermined duration of non-speech in the audio data. Before the predetermined duration of non-speech in the audio data, the operations include detecting a freeze word in the audio data. The freeze word follows the query in the utterance spoken by the user and captured by the user device. In response to detecting the freeze word in the audio data, the operations include triggering a hard microphone closing event at the user device prevent the user device from capturing any audio subsequent to the freeze word.

Implementations of the disclosure may include one or more of the following optional features. In some implementations, the freeze word includes one of a predefined freeze word that includes one or more fixed terms across all users in a given language, a user-selected freeze word that includes one or more terms specified by the user of the user device, or an action-specific freeze word associated with the operation to be performed by the digital assistant. In some examples, detecting the freeze word in the audio data includes: extracting audio features from the audio data; generating, using a freeze word detection model, a freeze word confidence score by processing the extracted audio features; and determining that the audio data corresponding to the utterance includes the freeze word when the freeze word confidence score satisfies a freeze word confidence threshold. In these examples, the freeze word detection model executes on the data processing hardware.

Detecting the freeze word in the audio data may include recognizing, using the speech recognizer that executes on the data processing hardware, the freeze word in the audio data. Optionally, the operations may further include, in response to detecting the freeze word in the audio data: instructing the speech recognizer to cease any active processing on the audio data; and instructing the digital assistant to fulfill performance of the operation.

In some implementations, processing the audio data to determine that the utterance includes the query for the digital assistant to perform the operation includes: processing, using the speech recognizer, the audio data to generate a speech recognition result for the audio data; and performing semantic interpretation on the speech recognition result for the audio data to determine that the audio data includes the query to perform the operation. In these implementations, in response to detecting the freeze word in the audio data, the operations also include: modifying the speech recognition result for the audio data by stripping the freeze word from the speech recognition result; and instructing, using the modified speech recognition result, the digital assistant to perform the operation requested by the query.

In some examples, prior to processing the audio data using the speech recognizer, the operations further include: detecting, using a hotword detection model, a hotword in the audio data that precedes the query; and in response to detecting the hotword, triggering the speech recognizer to process the audio data by performing speech recognition on the hotword and/or one or more terms following the hotword in the audio data. In these examples, the operations also includes verifying a presence of the hotword detected by the hotword detection model based on detecting the freeze word in the audio data. Optionally, detecting the freeze word in the audio data may include executing a freeze word detection model on the data processing hardware that is configured to detect the freeze word in the audio data without performing speech recognition on the audio data. The freeze word detection model and the hotword detection model each include the same or different neural network-based models.

Another aspect of the disclosure provides a system for detecting freeze words. The system includes data processing hardware and memory hardware storing instructions that when executed on the data processing hardware cause the data processing hardware to perform operations. The operations include receiving a first instance of audio data that corresponds to a dictation-based query for a digital assistant to dictate audible contents spoken by a user. The dictation-based query is spoken by the user and captured by an assistant-enabled device associated with the user. The operations also include receiving a second instance of the audio data that corresponds to an utterance of the audible contents spoken by the user and captured by the assistant-enabled device. The operations also include processing, using a speech recognizer, the second instance of the audio data to generate a transcription of the audible contents. During the processing of the second instance of the audio data, the operations include detecting a freeze word in the second instance of the audio data. The freeze word follows the audible contents in the utterance spoken by the user and captured by the assistant-enabled device. In response to detecting the freeze word in the second instance of the audio data, the operations include providing the transcription of the audible contents spoken by the user for output from the assistant-enabled device.

Implementations of the disclosure may include one or more of the following optional features. In some implementations, in response to detecting the freeze word in the second instance of the audio data, the operations further include: initiating a hard microphone closing event at the assistant-enabled device to prevent the assistant-enabled device from capturing any audio subsequent to the freeze word; ceasing any active processing on the second instance of the audio data; and prior to providing the transcription of the audible contents for output from the assistant-enabled device, stripping the freeze word from and end of the transcription.

Optionally, the operations may further include: processing, using the speech recognizer, the first instance of the audio data to generate a speech recognition result; and performing semantic interpretation on the speech recognition result for the first instance of the audio data to determine that the first instance of the audio data includes the dictation-based query to dictate the audible contents spoken by the user. In some examples, prior to initiating processing on the second instance of the audio data to generate the transcription, the operations also include: determining that the dictation-based query specifies the freeze word based on the semantic interpretation performed on the speech recognition result for the first instance of the audio data; and instructing an endpointer to increase an endpointing timeout duration for endpointing the utterance of the audible contents.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
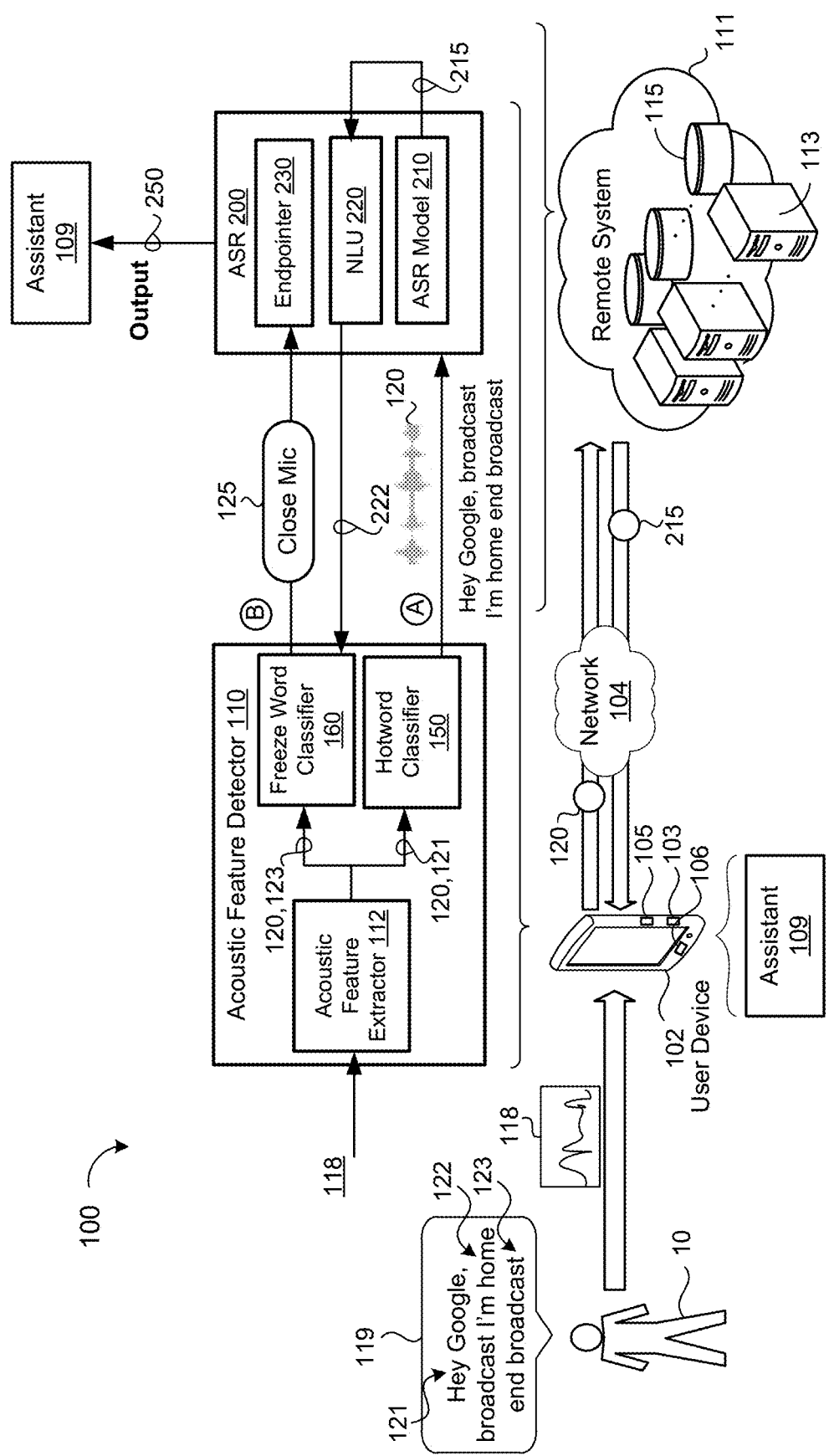
FIG. 1 is an example system including an assistant-enabled device configured to detect freeze words.

Speech-based interfaces such as digital assistants are becoming increasingly prevalent across a variety of devices including, without limitation, mobile phones and smart speakers/displays that include microphones for capturing speech. The general way of initiating voice interaction with an assistant-enabled device is to speak a fixed phrase, e.g., a hotword, that when detected by the speech-enabled device in streaming audio, triggers the assistant-enabled device to initiate a wake-up process to begin recording and processing subsequent speech to ascertain a query spoken by the user. Thus, the hotword is an important component in the overall digital assistant interface stack as it allows users to wake up their assistant-enabled devices from a low power state so that the assistant-enabled devices can proceed to perform more expensive processing such as full automated speech recognition ASR or server-based ASR.

A query spoken by a user that is directed toward an assistant-enabled device typically falls into two categories of queries: conversational queries and non-conversational queries. Conversational queries refer to standard digital assistant queries that query the digital assistant to perform operations such as "set a timer", "remind me to buy the milk", "how tall is Barack Obama", and so on. On the other hand, non-conversational queries refer to dictation-based queries which are longer-form queries where the user speaks to dictate an email, a message, document, social media post, or some other piece of content. For instance, the user may speak the query "send an email to Aleks saying" and then proceed to speak the contents of the email message that the digital assistant will dictate/transcribe and subsequently send from the user's email client to the recipient's (e.g., Aleks) email client.

ASR systems typically use endpointers to determine when a user has started and finished speaking. Once demarcated, the portion of the audio representing the user's speech can be processed to generate speech recognition results, and in some instances, semantic interpretation can be performed on the speech recognition results to ascertain a query spoken by the user. Endpointers typically evaluate a duration of pauses between words in determining when an utterance begins or ends. For instance, if a user says "what is <long pause> for dinner", the endpointer may segment the speech input at the long pause and cause the ASR system to only process the incomplete phrase "what is" instead of the complete phrase "what is for dinner". If an endpointer designates an incorrect end point for an utterance, the result of processing the utterance can be inaccurate and undesirable. At the same time, while allowing for longer duration of pauses between words in determining when an utterance begins or ends safeguards premature endpointing, a microphone of the user's assistant-enabled device detecting the utterance remains open and may detect sounds not intended for the user device. Additionally, delaying the closing of the microphone consequently delays execution of an action specified by the utterance. For instance, if the utterance spoken by the user was a query for a digital assistant to perform an action to "Call Mom", there will inevitably be a delay in the digital assistant initiating the call while the endpointer is waiting for an endpointing timeout duration to lapse to confirm that the user has likely stopped speaking. In this scenario, the assistant-enabled device may also detect additional unintended audio which may result in performance of an action different than what the user intended, which may result in wastage of computational resources in interpreting and acting on the additional audio detected due to the inability to determine in a timely fashion when the user has likely finished speaking.

To mitigate the drawbacks associated with endpointing timeout durations that are too short, e.g., potentially cutting off speech before the user has finished speaking, and endpointing time out durations that are too long, e.g., increasing the chance of capturing unintended speech and increased latency for executing an action specified by the utterance, implementations herein are directed toward freeze words, that when spoken at the end of an utterance, specify when the user is finished speaking to the assistant-enabled device. To some degree, a "freeze word" corresponds to an inverse of a hotword by permitting a user to manually endpoint an utterance and initiate a hard microphone closing event to end a voice-based conversation or a long-form utterance. That is, while a hotword will trigger an assistant-enabled device to wake-up from a sleep or hibernation state to begin processing speech, a freeze word will perform the inverse by causing all active processing on speech to cease and deactivating microphones on the assistant-enabled device, and thereby transition the assistant-enabled device back to the sleep or hibernation state.

In addition to turning off some or all of the speech processing in progress, once a freeze word is detected, the assistant-enabled device may additionally disable or adapt future processing for some amount of time to effectively make the assistant-enabled device less responsive. For instance, a hotword detection threshold may be temporarily raised to make it harder/less likely for a user to issue a subsequent query for some time window after speaking the freeze word. In this scenario, the raised hotword detection threshold may gradually reduce over time back to a default value. Additionally or alternatively, after detecting a freeze word spoken by a particular user, speech input is disabled for that particular user.

An assistant-enabled device executes an acoustic feature detection model configured to detect the presence of a freeze word in audio data corresponding to an utterance without performing speech recognition or semantic interpretation on the audio data. Here, the acoustic feature detection model may be a neural network-based model trained to detect one or more freeze words. The assistant-enabled device may employ the same or different acoustic feature detection model for detecting the presence of a hotword in the audio data. In the case that a same acoustic feature detection model is used for both hotword detection and freeze word detection, the functionality for only one of hotword detection and freeze word detection may be active at a time. Notably, acoustic feature detection models are capable of running on user devices due to their relatively compact size and lower processing requirements compared to ASR models.

In some configurations, in addition to triggering hard microphone closing events, the detection of a freeze word in audio data verifies a presence of a hotword recently detected in the audio data while an assistant-enabled device was in a sleep or hibernation state. Here, the detected hotword may be associated with a low hotword detection confidence score and the subsequent detection of the freeze word may serve as a proxy for verifying that the hotword is present in the audio data. In these configurations, the audio data may be buffered on the assistant-enabled device while the hotword detection and the freeze word detection is performed, and once the detection of the freeze word is detected in the buffered audio data, the assistant-enabled device may initiate a wake-up process to perform speech recognition on the buffered audio data.

In some additional implementations, freeze word detection leverages an automated speech recognizer that is currently executing on-device or server-side to recognize the presence of the freeze word. The speech recognizer may be biased to recognize one or more particular freeze words.

In some examples, a language model may be leveraged to determine if a freeze word is detected in the audio. In these examples, the language model may allow the assistant-enabled device to identify scenarios where the freeze word is actually part of the user's utterance/query, and not spoken by the user to endpoint the utterance/query. Further, the language model can also allow for of near matches of freeze words where a phrase is similar to a freeze word and the freeze word is unlikely to be part of the user's query/utterance per a language model score.

An assistant-enabled device may be capable of recognizing one or more different types/categories of freeze words such as, without limitation, predefined freeze words, custom freeze words, user-selected freeze words, action-specific freeze words, and query-specific freeze words. A predefined freeze word may include a phrase of one or more fixed terms across all users in a given language. For instance, for conversational queries of "Call Mom right now" and "Tell me the temperature outside, thanks Google" the phrases "right now" and "thanks Google" correspond to freeze words for allowing the user to manually endpoint the respective queries.

A user-selected freeze word may correspond to a freeze word specified by a particular user upfront, e.g., during setup of the digital assistant. For instance, the user may select a freeze word from a list of suggested freeze words. Optionally, the user may specify one or more custom terms for use as a freeze word by typing or speaking the terms. In some scenarios, the user specifies user-selected freeze words to be active for particular types of queries. Here, a user may assign different user-selected freeze words for dictation-based queries than for conversational queries. For example, in the dictation-based query "Hey Google send a message to Aleks saying 'I'll be late for our meeting' The End". In this example, "Hey Google" corresponds to a hotword, the phrase "send a message to Aleks saying" corresponds to a query for the digital assistant to dictate and send a message to a recipient, the phrase "I'll be late for our meeting" corresponds to the contents of the message, and the phrase "The End" includes a user-selected freeze word for manually endpointing the query. Thus, upon detecting the freeze word "The End", the assistant-enabled device will immediately endpoint the utterance and cause a speech recognizer to strip the freeze word from the dictated message before sending to the recipient. Alternatively, the phrase "send a message to Aleks saying" could instead correspond to a query for the digital assistant to facilitate an audio-based communication between the user and recipient in which the contents of the message "I'll be late for our meeting" or simply sent as a voice message to the recipient for audible playback on the recipient's device. Notably, the freeze word "The End" when detected by the assistant-enabled device will immediately endpoint the utterance and strip audio of the freeze word from the voice message before sending to the recipient.

An action-specific freeze word is associated with a particular operation/action specified by a query for a digital assistant to perform. For example, a user speaking the query "Hey Google broadcast I'm home end broadcast" includes the freeze word "end broadcast" specific to broadcast action performed by the digital assistant. In this example, the term "broadcast I'm home" specifies the action of broadcasting an audible notification through one or more speakers to indicate to other individuals that the user is home. The audible notification may include a specific melody or chime that permit individuals hearing the audible notification to ascertain that the user is home. In some implementations, the action-specific freeze word is enabled in parallel with a user-specified freeze word and/or a predefined freeze word.

A query-specific freeze word may be specified as part of a query spoken by a user. For example, the following utterance "Hey Google, dictate the following journal entry until I say I'm done <contents of journal entry> I'm done" includes a dictation-based query for the digital assistant to dictate contents spoken by the user for a journal entry. Additionally, the dictation-based query further specifies a freeze word "I'm Done" before the user starts speaking the contents of the journal entry. Here, the freeze word "I'm Done" specified as part of the dictation-based query instructs an endpointer to wait, or at least extend an endpoint timeout duration, to trigger endpointing until the freeze word "I'm Done" is detected. Extending the endpoint time duration allows for long pauses while the user is speaking the contents of the journal entry that would otherwise trigger endpointing. In some examples, the query-specific freeze word is enabled in parallel with a user-specified freeze word and/or a predefined freeze word.

Referring to FIG. 1, in some implementations, an example system 100 includes an assistant-enabled device (AED) 102 associated with one or more users 10 and in communication with a remote system 111 via a network 104. The AED 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The AED 102 includes or is in communication with one or more microphones 106 for capturing utterances from the respective user 10. The remote system 111 may be a single computer, multiple computers, or a distributed system (e.g., a cloud environment) having scalable/elastic computing resources 113 (e.g., data processing hardware) and/or storage resources 115 (e.g., memory hardware).

The AED 102 includes an acoustic feature detector 110 configured to detect the presence of hotword(s) 121 and/or freeze word(s) 123 in streaming audio 118 without performing semantic analysis or speech recognition processing on the streaming audio 118. The AED 102 also includes an acoustic feature extractor 112 which may be implemented as part of the acoustic feature detector 110 or a separate component from the acoustic feature detector 110. The acoustic feature extractor 112 is configured to extract acoustic features from utterances 119. For instance, the acoustic feature extractor 112 may receive streaming audio 118 captured by the one or more microphones 106 of the AED 102 that corresponds to an utterance 119 spoken by the user 10 and extract acoustic features from audio data 120 corresponding to the utterance 119. The acoustic features may include Mel-frequency cepstrum coefficients (MFCCs) or filter bank energies computed over windows of the audio data 120 corresponding to the utterance 119.

The acoustic feature detector 110 may receive the audio data 120 including the acoustic features extracted by the acoustic feature extractor 112, and based on the extracted features, a hotword classifier 150 is configured to classify whether the utterance 119 includes a particular hotword 121 spoken by the user 10. The AED 102 may store the extracted acoustic features in a buffer of the memory hardware 105 and the hotword classifier 150 may use the acoustic features in the buffer to detect whether the audio data 120 includes the hotword 121. The hotword classifier 150 may also be referred to as a hotword detection model 150. The AED 102 may include multiple hotword classifiers 150 each trained to detect a different hotword associated with a particular term/phrase. These hotwords may be predefined hotwords and/or custom hotwords assigned by the user 10. In some implementations, the hotword classifier 150 includes a trained neural network-based model received from the remote system 111 via the network 104.

The acoustic feature detector 110 also includes a freeze word classifier 160 configured to classify whether the utterance 119 includes a freeze word 123 spoken by the user 10. The freeze word classifier 160 may also be referred to as a freeze word detection model 160. The AED 102 may include multiple freeze word classifiers 160 each trained to detect a different freeze word associated with a particular term/phrase. As described in the remarks above, the freeze words may include predefined freeze words, user-selected freeze words, action-specific freeze words, and/or query-specific freeze words. As with the hotword classifier 150, the freeze word classifier 160 may include a trained neural network-based model received from the remote system 111. In some examples, the freeze word classifier 160 and the hotword classifier 150 are incorporated into the same neural network-based model. In these examples, respective portions of the neural network model corresponding to the hotword classifier 150 and the freeze word classifier 160 are never simultaneously active. For example, while the AED 102 is in a sleep state, the hotword classifier 150 may be active to listen for a hotword 121 in streaming audio 118 and the freeze word classifier 160 may be inactive. Once the hotword 121 is detected to trigger the AED 102 to wake-up and process subsequent audio, the hotword classifier 150 may now be inactive and the freeze word classifier 160 may be active to listen for the freeze word 123 in the streaming audio 118. The classifiers 150, 160 of the acoustic feature detector 110 may run on a first processor of the AED 102, such as a digital signal processor (DSP), and/or a second processor of the AED 102, such as an application processor (AP) or CPU), that consumes more power while operating than the first processor.

In some implementations, the hotword classifier 150 is configured to identify hotwords that are in the initial portion of the utterance 119. In the example shown, the hotword classifier 150 may determine that the utterance 119 "Ok Google, broadcast I'm home end broadcast" includes the hotword 121 "Ok Google" if the hotword classifier 150 detects acoustic features in the audio data 120 that are characteristic of the hotword 121. For example, the hotword classifier 150 may detect that the utterance 119 "Ok Google, broadcast I'm home end broadcast" includes the hotword 121 "Ok Google" based on generating MFCCs from the audio data and classifying that the MFCCs include MFCCs that are similar to MFCCs that are characteristic of the hotword "Ok Google" as stored in a model of the hotword classifier 150. As another example, the hotword classifier 150 may detect that the utterance 119 "Ok Google, broadcast I'm home end broadcast" includes the hotword 121 "Ok Google" based on generating mel-scale filterbank energies from the audio data and classifying that the mel-scale filterbank energies include mel-scale filterbank energies that are similar to mel-scale filterbank energies that are characteristic of the hotword "Ok Google" as stored in the model of the hotword classifier 150.

At stage A of the acoustic feature detector 110, when the hotword classifier 150 determines that the audio data 120 corresponding to the utterance 119 includes the hotword 121, the AED 102 may trigger a wake-up process to initiate speech recognition on the audio data 120 that corresponds to the utterance 119. For example, an automated speech recognition (ASR) engine 200 (interchangeably referred to as 'speech recognizer' 200) running on the AED 102 may perform speech recognition or semantic interpretation on the audio data that corresponds to the utterance 119. The speech recognizer 200 may include an ASR model 210, a natural language understanding (NLU) module 220, and an endpointer 230. The ASR model 210 may process the audio data 120 to generate a speech recognition result 215 and the NLU module 220 may perform semantic interpretation on the speech recognition result 215 to determine that the audio data 120 includes a query 122 for the digital assistant 109 to perform an operation. In this example, the ASR model 210 may process the audio data 120 to generate a speech recognition result 215 for "broadcast I'm home end broadcast" and the NLU module 220 may identify "broadcast I'm home" as the query 122 for the digital assistant 109 to perform the operation of broadcasting an audible notification for audible output from one or more speakers that indicates to other individuals that the user is home. Alternatively, the query 122 may be for the digital assistant 109 to broadcast a voice message of the user speaking "I'm home" for audible output from the one or more speakers. The NLU module 220 may also be leveraged to determine if the presence of a freeze word detected in the audio data 120 was actually part of the query 122, and thus not spoken by the user to endpoint the utterance. Thus, the NLU 220 may override the detection of a freeze word in scenarios where the freeze word is in fact part of the utterance. The NLU 220 may leverage a language model score in these scenarios.

In some implementations, the speech recognizer 200 is located on the remote system 111 in addition to, or in lieu, of the AED 102. Upon the hotword classifier 150 triggering the AED 102 to wake-up responsive to detecting the hotword 121 in the utterance 119, the AED 102 may transmit the audio data 120 corresponding to the utterance 119 to the remote system 111 via the network 104. The AED 102 may transmit the portion of the audio data that includes the hotword 121 for the remote system 111 to confirm the presence of the hotword 121 performing speech recognition via the ASR model 210. Alternatively, the AED 102 may transmit only the portion of the audio data 120 that corresponds to the portion of the utterance 119 after the hotword 121 to the remote system 111. The remote system 111 executes the ASR model 210 to generate the speech recognition result 215 for the audio data 120. The remote system 111 may also execute the NLU module 220 to perform semantic interpretation on the speech recognition result 215 to identify the query 122 for the digital assistant 109 to perform the operation. Alternatively, the remote system 111 may transmit the speech recognition result 215 to the AED 102 and the AED 102 may execute the NLU module 220 to identify the query 122.

With continued reference to FIG. 1, the endpointer 230 is configured to trigger endpointing of the utterance after a predetermined duration of non-speech in the audio data 120. Here, the predetermined duration of non-speech may correspond to an endpointing timeout duration in which the endpointer 230 will endpoint utterances upon detecting a period of non-speech for at least a predetermined duration. That is, the endpointer 230 endpoints an utterance by making a hard microphone closing decision that instructs the one or more microphones 106 at the AED 102 to close and no longer capture streaming audio 118. The endpointing timeout duration is typically set to a default value that is long enough to prevent prematurely endpointing utterances so that contents of utterances are not cut-off before a user is finished speaking. At the same time, while setting longer endpointing timeout durations allow for longer pauses between words in speech and prevent processing incomplete phrases, a microphone of the assistant-enabled device remains open and may detect sounds not directed toward the assistant-enabled device. Additionally, delaying the closing of the microphone consequently delays execution of the action/operation specified by the query.

While the speech recognizer 200 is processing the audio data 120 and before the endpointer 230 detects the predetermined duration of non-speech in the audio data, the freeze word classifier 160 simultaneously runs on the AED 102 and detects the freeze word 123 "end broadcast" in the audio data 120. Here, the freeze word 123 "end broadcast" follows the query 122 at the end of the utterance 119 spoken by the user 102 and corresponds to an action-specific freeze word 123. That is, the freeze word 123 "end broadcast" is specific to the action/operation of broadcasting a notification or message through acoustic speakers. In some examples, the NLU 220 provides an instruction 222 to the acoustic feature detector 110 to activate/enable the freeze word 123 "end broadcast" responsive to determining that the speech recognition result 215 for the audio data 120 includes the query 122 for the digital assistant 109 to perform the operation of broadcasting. In these examples, the acoustic feature detector 110 may activate/enable a freeze word detection model that is configured to detect the freeze word 123 "end broadcast".

In some implementations, the freeze word classifier 160 running on the AED 102 is configured to identify freeze words 123 that are at the end of the utterance 119 without performing speech recognition or semantic interpretation. For instance, in this example, the freeze word classifier 160 may determine that the utterance 119 "Ok Google, broadcast I'm home end broadcast" includes the freeze word 123 "end broadcast" if the freeze word classifier 160 detects acoustic features in the audio data 120 that are characteristic of the freeze word 123. For example, the freeze word classifier 160 may detect that the utterance 119 "Ok Google, broadcast I'm home end broadcast" includes the freeze word 123 "end broadcast" based on generating MFCCs from the audio data and classifying that the MFCCs include MFCCs that are similar to MFCCs that are characteristic of the freeze word 123 "end broadcast" as stored in a model of the freeze word classifier 160. As another example, the freeze word classifier 160 may detect that the utterance 119 "Ok Google, broadcast I'm home end broadcast" includes the freeze word 123 "end broadcast" based on generating mel-scale filterbank energies from the audio data and classifying that the mel-scale filterbank energies include mel-scale filterbank energies that are similar to mel-scale filterbank energies that are characteristic of the hotword "Ok Google" as stored in the model of the hotword classifier 150. The freeze word classifier 160 may generate a freeze word confidence score by processing the extracted audio features in the audio data 120 and determine that the audio data 120 corresponding to the utterance 119 includes the freeze word 123 when the freeze word confidence score satisfies a freeze word confidence threshold.

At stage B of the acoustic feature detector 110, in response to the freeze word classifier 160 detecting the freeze word 123 in the audio data 120 before the endpointer 230 detects the predetermined duration of non-speech in the audio data, the AED 102 may trigger a hard microphone closing event 125 at the AED 102 that prevents the AED 102 from capturing any streaming audio 118 subsequent to the freeze word 123. For instance, triggering the hard microphone closing event 125 may include the AED 102 deactivating the one or more microphones 106. Thus, the freeze word 123 is spoken by the user 10 as a manual cue to indicate when the user 10 is finished speaking the query 122, and thereby trigger the hard microphone closing event 125 without waiting for the endpointer timeout duration to lapse so that the endpointer 230 can endpoint the utterance. Instead, triggering the hard microphone closing event 125 responsive to detecting the freeze word 123 causes the AED 102 to instruct the endpointer 230 and/or ASR model 210 to immediately endpoint the utterance. Triggering the hard microphone closing event 125 also causes the AED 102 to instruct the ASR system 200 cease any active processing on the audio data and instructs the digital assistant 109 to fulfill performance of the operation. As a result, speech recognition accuracy is improved since no subsequent speech or background noise is captured by the microphones 106 subsequent to the user speaking the freeze word 123, while at the same time latency is improved, since the utterance 119 is manually endpointed to permit the digital assistant 109 start fulfilling performance of the operation specified by the query 122 without having to wait for the endpointing timeout duration to lapse. In the example shown, the ASR system 200 provides an output 250 to the digital assistant 109 that causes the digital assistant 109 to perform the operation specified by the query 122. The output 250 may include an instruction to perform the operation.

In some scenarios, the output 250 also includes the speech recognition result 215 for the audio data 120 corresponding to the utterance 119. These scenarios may occur when the query 122 identified by the ASR system 200 corresponds to a search query in which case the speech recognition result 215 for the search query 122 is provided as the output 250 to a search engine (not shown) to retrieve a search result. For instance, an utterance 119 of "Hey Google, tell me the weather for tomorrow now Google" may include the hotword "Hey Google", the conversational search query 122 "tell me the weather for tomorrow", and lastly a freeze word "now Google". The ASR system 200 may process audio data 120 to generate a speech recognition result 215 for the utterance 119 and perform semantic interpretation on the speech recognition result 215 to identify the search query 122. Continuing with this example, responsive to the freeze word classifier 160 detecting the freeze word "now Google", the AED 102 may trigger the hard microphone closing event 125 and the ASR system 200 may strip the phrase "now Google" from the end of speech recognition result 215 (e.g., transcription 225) and provide speech recognition result 215 as a search query to the search engine for retrieving a search result for tomorrow's weather forecast. In this example, the freeze word "now Google" may include a predefined freeze word 123 common to all users of a given language, that when spoken while speech recognition is active, manually triggers the hard microphone closing event 125.

In some implementations, the digital assistant 109 is enabled for continued conversation in which the microphone 106 may be left open to accept follow-up queries from the user after the digital assistant 109 outputs a response to a previous query. For instance, using the example above, the digital assistant 109 may audibly output the search result for tomorrow's weather forecast as synthesized speech and then instruct the microphone 106 to remain open so that the user 102 can speak a follow-up query without having to repeat speaking the hotword 121 as a prefix to the follow-up query. In this example, if the user 102 does not have a follow-up query, the user 102 speaking the phrase "Thanks Google" (or other phrase of one or more fixed terms) may serve as a freeze word 123 to trigger the hard microphone closing event. Leaving the microphone 106 open for a fixed duration to accept a follow-up query that the user 10 may or may not speak inevitably requires increased processing since speech processing is active while the microphone 106 is open to thereby increase power consumption and/or bandwidth use. Thus, the user 10 speaking the freeze word may trigger the hard microphone closing event to prevent the AED 102 from capturing unintended speech and provide power and bandwidth savings since the AED 102 may transition to low-power sleep or hibernation state.

In some examples, if the user 10 speaks the freeze word to close the microphone 106 and end continued conversation, the AED 102 temporarily raises the hotword detection threshold and/or ignores subsequent speech spoken by the same user 10 for some period of time. The AED 102 may store a reference speaker embedding for the user 10 indicating voice characteristics of the user that can be compared with a verification speaker embedding extracted from an utterance. For instance, the verification speaker embedding can be text-dependent where the embedding is extracted from a spoken hotword and the reference speaker embedding can be extracted from the user 10 speaking the same hotword one or more times during enrollment and/or one or more previous interactions with the digital assistant 109. When the verification speaker embedding extracted from a subsequent utterance matches the reference speaker embedding for the user 10, the speech may be ignored if the subsequent utterance was provided shortly after the user 10 spoke the freeze word to trigger hard microphone closing.

Figure 2A:
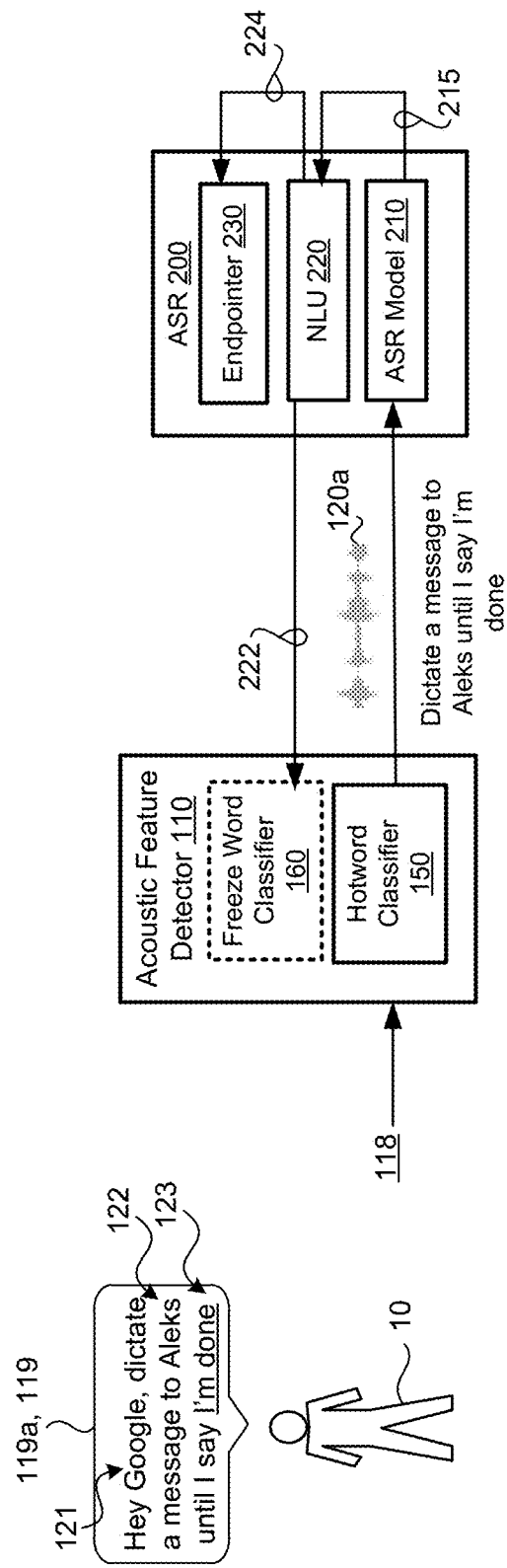
FIG. 2A is a schematic view of a first instance of a user utterance corresponding to a dictation-based query that specifies a freeze word for endpointing a second instance of the user utterance.
Figure 2B:
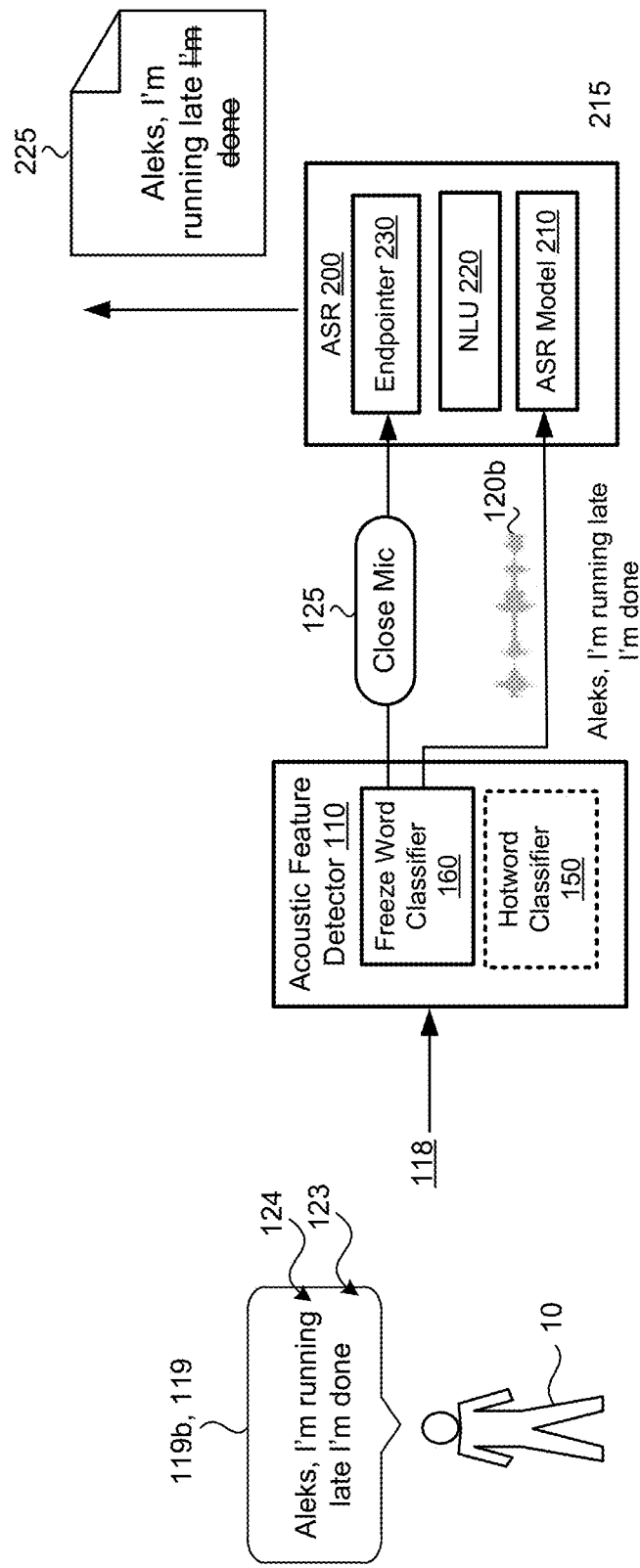
FIG. 2B is a schematic view of an acoustic feature detector instructing an endpointer to endpoint an utterance in response to detecting a freeze word in the utterance.

FIGS. 2A and 2B show the ASR engine 200 receiving a first instance of audio data 120a (FIG. 2A) corresponding a dictation-based query 122 for the digital assistant 109 to dictate audible contents 124 and a second instance 120b of the audio data 120 (FIG. 2B) corresponding to an utterance 119, 119b of the audible contents 124. Referring to FIG. 2A, the AED 102 captures a first instance 119a of an utterance 119 spoken by the user 10 that includes "Hey Google, dictate a message to Aleks until I say I'm done." In this example, "Hey Google" corresponds to the hotword 121, the phrase "dictate a message to Aleks" corresponds to a dictation-based query 122 for the digital assistant 109 to dictate a message to Aleks, and the phrase "until I say I'm done" specifies a freeze word for endpointing audible contents 124 for the message in which the phrase "I'm done" corresponds to the freeze word 123.

The acoustic feature detector 110 receives streaming audio 118 captured by the one or more microphones 106 of the AED 102 that corresponds to the first instance 119a of the utterance 119. The hotword classifier 150 determines that the streaming audio 118 includes the hotword 121. For example, the hotword classifier 150 determines that the streaming audio 118 includes the hotword 121 "Hey Google." After the hotword classifier 150 determines the streaming audio 118 includes the hotword 121, the AED 102 triggers the wake-up process to initiate speech recognition on the first instance 120a of audio data 120 that corresponds to the first instance 119a of the utterance 119.

The ASR 200 receives the first instance 120a of the audio data 120 from the acoustic feature detector 110. The ASR model 210 may process the first instance 120a of the audio data 120 to generate a speech recognition result 215. For example, the ASR model 210 receives the first instance 120a of the audio data 120 corresponding to the utterance 119a "dictate a message to Aleks until I say I'm done" and generates a corresponding speech recognition result 215. The NLU module 220 may receive the speech recognition result 215 from the ASR model 210 and perform semantic interpretation on the speech recognition result 215 to determine that the first instance 120a of the audio data 120 includes the dictation-based query 122 for the digital assistant 109 to dictate the audible contents 124 spoken by the user 10. In particular, the semantic interpretation performed by the NLU 220 on the speech recognition result 215 identifies the phrase "dictate a message to Aleks" as the dictation-based query 122 for the digital assistant 109 to dictate audible contents 124 for a message (e.g., electronic message or email) to a recipient, Aleks. In addition to messages, a dictation-based query 122 may be associated with dictating other types of content such as audible contents corresponding to a journal entry or notes to be stored in a document.

In some implementations, the ASR 200 further determines that the dictation-based query 122 specifies the freeze word 123 based on the semantic interpretation performed on the speech recognition result 215 for the first instance of the audio data 120. For instance, in the example shown, the NLU 220 identifies the phrase "until I say I'm done" as an instruction to set the phrase "I'm done" as a freeze word 123 for endpointing the audible contents 124 of the message. In some examples, the NLU 220 provides an instruction 222 to the acoustic feature detector 110 to activate/enable the freeze word 123 "I'm done" responsive to determining that the speech recognition result 215 for the first instance of the audio data 120a specifies the freeze word 123. In these examples, the acoustic feature detector 110 may activate/enable the freeze word classifier (e.g., freeze word detection model) 160 to detect the freeze word 123 "I'm done" in subsequent streaming audio 118 captured by the AED 102.

In some examples, the freeze word classifier 160 and the hotword classifier 150 are never simultaneously active. The dotted line that surrounds the freeze word classifier 160 in FIG. 2A indicates that the freeze word classifier 160 is currently inactive while the solid line that surrounds the hotword classifier 150 indicates that the hotword classifier 150 is active. For example, before the NLU 220 sends the instruction 222 to the acoustic feature detector 110 to activate/enable the freeze word classifier 160 for detecting the freeze word 123 "I'm done", the hotword classifier 150 may be active (e.g., indicated by the solid line) to listen for the hotword 121 in streaming audio 118 and the freeze word classifier 160 may be inactive (e.g., indicated by the dotted line). Once the NLU 220 determines that the speech recognition result 215 includes the dictation-based query 122 and that the dictation-based query 122 specifies the freeze word 123, the NLU 220 transmits the instruction 222 to the acoustic feature detector 110 to cause the acoustic feature detector 110 to activate the freeze word classifier 160 for detecting the freeze word "I'm done" in subsequent streaming audio 118 and deactivate the hotword classifier 150.

In the example shown, the freeze word 123 "I'm done" corresponds to a query-specific freeze word that is specified as part of the query 122 spoken by the user 10. Notably, the dictation-based query 122 specifies the freeze word 123 "I'm Done" before the user starts speaking the audible contents 124 of the message. Here, the freeze word "I'm Done" specified as part of the dictation-based query instructs an endpointer to wait, or at least extend an endpoint timeout duration, to trigger endpointing until the freeze word "I'm Done" is detected. In some implementations, the NLU 220 sends an instruction 224 to the endpointer 230 to increase the endpointing timeout duration. Extending the endpoint time duration allows for long pauses once the user 10 begins speaking the audible contents 124 of the message that would otherwise trigger endpointing. In some examples, the query-specific freeze word is enabled in parallel with an action-specific freeze word (e.g., "End Message") and/or a user-specified freeze word (e.g., "The End"), and/or a predefined freeze word (e.g., "Thanks Google").

In scenarios when the NLU 220 determines that the speech recognition result 215 includes the dictation-based query 122 but that the dictation-based query 122 does not specify the query-specific freeze word 123, the NLU 220 would not send an instruction 222 to the acoustic feature detector 110 to cause the acoustic feature detector 110 to activate/enable the freeze word classifier 160 to detect any query-specific freeze word since none was specified by the query 122. However, the NLU 220 could still send an instruction 222 to the acoustic feature detector 110 to activate/enable the freeze word classifier 160 to detect at least one of an action-specific freeze word, a user-defined freeze word, or a predefined freeze word. Optionally, the acoustic feature detector 110 may automatically activate/enable the freeze word classifier 160 to detect user-defined and/or predefined freeze words in subsequent streaming audio 118 upon detecting the hotword 121 in the streaming audio 118 corresponding to the first instance 119a of the utterance 119.

Referring now to FIG. 2B, after the user 10 speaks the first instance 119a of the utterance 119 that conveys the hotword 121 and the dictation-based query 122 specifying the query-specific freeze word 123, the user 10 subsequently speaks a second instance 119b of the utterance 119 to convey the audible contents 124 of the message the user 10 wants the digital assistant 109 to dictate followed by the query-specific freeze word 123 indicating that the user 10 has completed speaking the audible contents 124 of the message. Notably, the user 10 does not need to prefix the second instance 119b of the utterance 119 with the hotword 121 since the AED 102 is now awake and the ASR 200 remains active responsive to the hotword classifier 150 detecting the hotword 121 "Hey Google" in the first instance 119a of the utterance 119. In the example shown, the second instance 119b of the utterance 119 includes "Aleks, I'm running late I'm done." In this example, the phrase "Aleks, I'm running late" corresponds to the audible contents 124 of the message and the phrase "I'm done" corresponds to the query-specific freeze word 123 specified by the dictation-based query 122 in the first instance 119a of the utterance 119 spoken by the user 10 in FIG. 2A. In lieu of the query-specific freeze word "I'm done" following the audible contents 124, other types of freeze words 123 could follow the audible contents 124 to similarly trigger endpointing of the audible contents 124.

The acoustic feature detector 110 executing on the AED 102 receives streaming audio 118 captured by the one or more microphones 106 of the AED that corresponds to the second instance 119b of the utterance 119. The hotword classifier 150 is now inactive (e.g., as indicated by the dotted lines) and the freeze word classifier 160 is now active (e.g., as indicated by the solid line) responsive to the acoustic feature detector 110 receiving the instruction 222 from the NLU 220 in FIG. 2A for activating/enabling the freeze word classifier 160 to listen for the presence of the query-specific freeze word 123 in the streaming audio 118. The acoustic feature detector 110 utilizes the freeze word classifier 160 to determine whether the streaming audio 118 includes the freeze word 123. The acoustic feature detector 110 transmits a second instance 120b of the audio data 120 to the ASR 200. The ASR 200 receives the second instance 120b of the audio data 120 that corresponds to the second instance 119b of the utterance 119 of the audible contents 124 spoken by the user 10 and captured by the AED 102. Moreover, the endpointer 220 is applying the extended endpointing timeout duration responsive to receiving the instruction 224 from the NLU 220 based on the dictation-based query 122 specifying the freeze word 123 "I'm Done" in the first instance 119a of the utterance 119 of FIG. 2A.

The ASR 200 processes the second instance 120b of the audio data 120 to generate a transcription 225 of the audible contents 124. For example, the ASR 200 generates a transcription 225 of the audible contents 124 "Aleks, I'm running late". During the processing of the second instance 120b of the audio data 120 at the ASR 200, the acoustic feature detector 110 detects the freeze word 123 in the second instance 120b of the audio data 120. Specifically, the freeze word classifier (e.g., freeze word detection model) 160 detects the presence of the freeze word 123 in the second instance 120b of the audio data 120. In the example shown, the freeze word 123 includes the query-specific freeze word "I'm done" to indicate the end of the audible contents 124. The freeze word 123 follows the audible contents 124 in the second instance 119a of the utterance 119 spoken by the user 10.

In response to detecting the freeze word 123 in the second instance 120b of the audio data 120, the ASR 200 provides the transcription 225 of the audible contents 124 spoken by the user 10 for output from the AED 102. The AED 102 may output the transcription 225 by transmitting the transcription 225 to a recipient device (not shown) associated with the recipient, Aleks. In scenarios when the transcription 225 dictates audible contents 124 related to notes or a journal entry, the AED 102 may provide the transcription 225 for output by storing the transcription 225 in a document or sending the transcription 225 to an associated application. Further, the AED 102 may output the transcription 225 by displaying the transcription on a graphical user interface (if available) of the AED. Here, the user 10 can view the transcription 225 before sending to the recipient device in case the user 10 wants to re-dictate the transcription 225, fix any mis-transcribed terms, and/or change any of the contents of the message. Additionally or alternatively, the AED 102 may employ a text-to-speech (TTS) module to convert the transcription 225 to synthesized speech for audible playback to the user 10 so that the user 10 can confirm that the user 10 wants the transcription 225 sent to the recipient device. In configurations when the ASR 200 executes server-side on the remote system 111 (FIG. 1), the ASR 200 may transmit the transcription 225 to the AED 102 and/or transmit the transcription 225 to the recipient device. That is the ASR 200 provides the transcription 225 "Aleks, I'm running late" that corresponds to the audible contents 124 of the second instance 120b of the audio data 120.

In some examples, in response to detecting the freeze word 123 in the second instance 120b of the audio data 120, the acoustic feature detector 110 initiates/triggers a hard microphone closing event 125 at the AED 102. The hard microphone closing event 125 prevents the AED 102 from capturing any audio subsequent to the freeze word 123. That is, triggering the hard microphone closing event 125 at the AED 102 may include the AED 102 deactivating the one or more microphones 106. Thus, the freeze word 123 is spoken by the user 10 as a manual cue to indicate when the user 10 is finished speaking the audible contents 124 for the dictation-based query 122, and thereby trigger the hard microphone closing event 125 without waiting for the endpointer timeout duration to lapse so that the endpointer 230 can endpoint the second instance 119b of the utterance 119 immediately. Instead, triggering the hard microphone closing event 125 responsive to detecting the freeze word 123 causes the AED 102 to instruct the endpointer 230 and/or ASR model 210 to immediately endpoint the utterance. Triggering the hard microphone closing event 125 also causes the AED 102 to instruct the ASR system 200 to cease any active processing on the second instance 120b of the audio data 120 and instructs the digital assistant 109 to fulfill performance of the operation.

In some additional implementations, the ASR system 200 detects the presence of the freeze word 123 in the second instance 120b of the audio data 120 in addition to, or in lieu of, the freeze word classifier 160 of the acoustic feature detector 110. That is, since the ASR 200 is already active processing the second instance 120b of the audio data 120b responsive to the hotword classifier 150 detecting the hotword 121 in the first instance 120a of the audio data 120, the ASR 200 is capable of recognizing the presence of the freeze word 123 in the second instance 120b of the audio data 120. Accordingly, the ASR 200 may be configured to initiate the hard microphone closing event 125 at the AED 200, cease active processing on the second instance 120b of the audio data 120, and strip the recognized freeze word 123 from the end of the transcription 225. Expanding on this capability of the ASR system 200 further, the freeze word classifier 160 may run on the AED 102 as a first-stage freeze word detector and the ASR system 200 may be employed as a second-stage freeze word detector to confirm the presence of a freeze word detected in audio data by the freeze word classifier 160.

In some implementations, while processing the second instance 120b of the audio data 120 to generate a transcription 225 of the audible contents 124, the ASR 200 also transcribes the freeze word 123 for inclusion in the transcription 225. For example, the transcription 225 of the audible contents 124 may include "Aleks, I'm running late I'm done." Here, the transcription 225 of the audible contents 124 inadvertently includes the freeze word 123 "I'm done" as a portion of the audible contents 124 of the message. That is, the user 10 did not intend for the digital assistant 109 to dictate the freeze word 123 as part of the audible contents 124 to be included in the transcription 225, but rather was spoken to designate an end of the audible contents 124. Accordingly, the hard microphone closing event 125 initiated at the AED 102 responsive to detecting the freeze word 123 may cause the ASR 200 to strip the freeze word 123 from the end of the transcription 225 prior to providing the transcription 225 of the audible contents 124 for output from the AED 102. Additionally or alternatively, the ASR 200 may recognize the presence of the freeze word 123 at the end of the transcription 225 and accordingly strip the freeze word 123 from the end of the transcription 225. In the example shown, the ASR 200 strips the freeze word 123 "I'm done" from the transcription 225 "Aleks, I'm running late I'm done" prior to providing the transcription 225 for output 250. Thus, after the ASR 200 strips the freeze word 123 from the transcription 225, the ASR 200 provides the transcription 225 "Aleks, I'm running late" for output 250 from the AED 102.

Figure 3:
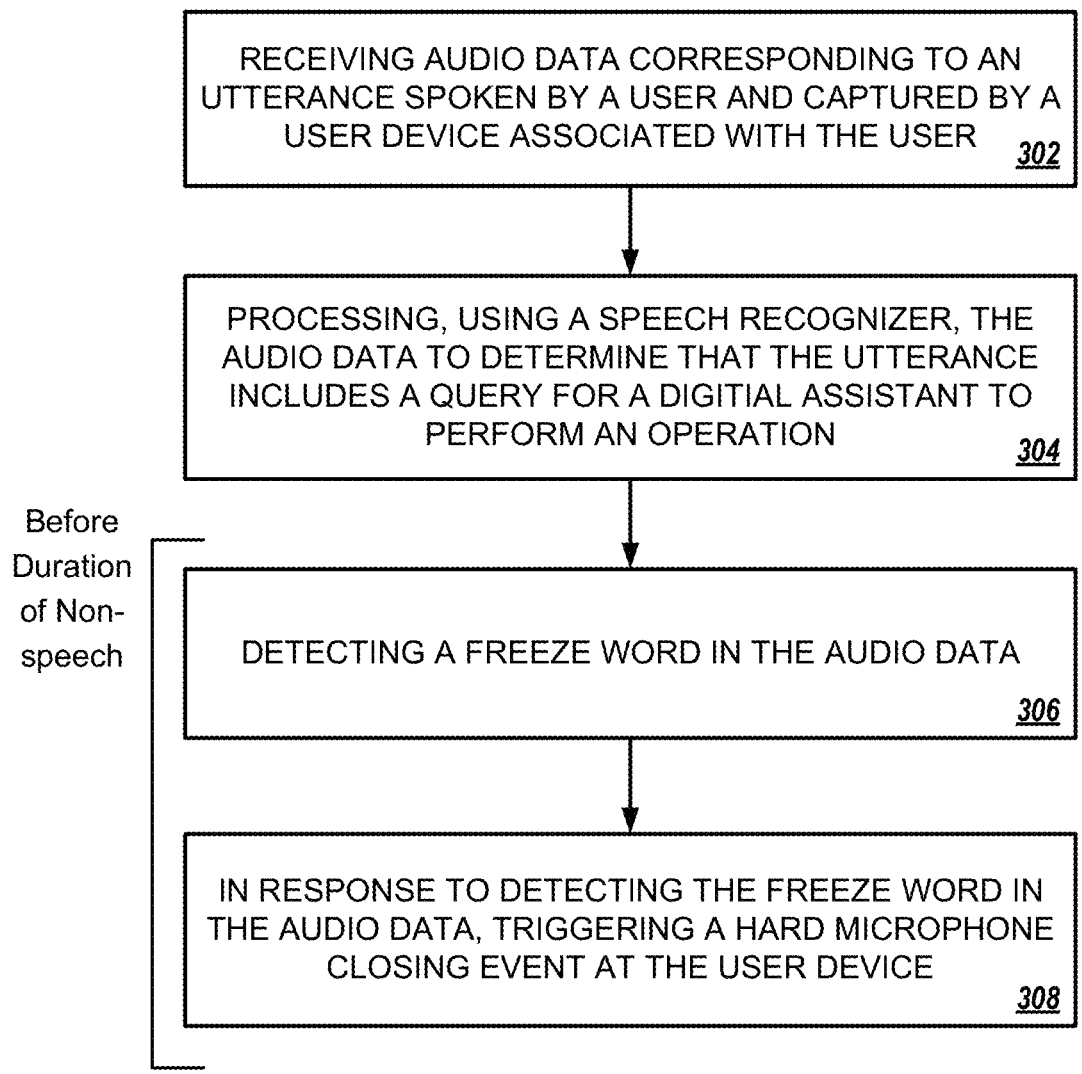
FIG. 3 is a flowchart of an example arrangement of operations for a method of detecting a freeze word in an utterance.

FIG. 3 is a flowchart of an exemplary arrangement of operations for a method 300 for detecting freeze words. The method 300, at operation 302, includes receiving, at data processing hardware 113, audio data 120 that corresponds to an utterance 119 spoken by a user 10 and captured by a user device 102 associated with the user 10. At operation 304, the method 300 includes processing, by the data processing hardware 113, using a speech recognizer 200, the audio data 120 to determine that the utterance 119 includes a query 122 for a digital assistant 109 to perform an operation. The speech recognizer 200 is configured to trigger endpointing of the utterance 119 after a predetermined duration of non-speech in the audio data 120.

At operation 306, before the predetermined duration of non-speech in the audio data 120, the method 300 includes detecting, by the data processing hardware 113, a freeze word 123 in the audio data 120. The freeze word 123 follows the query 122 in the utterance 119 spoken by the user 10 and captured by the user device 102. At operation 308, in response to detecting the freeze word 123 in the audio data 120, the method 300 includes triggering, by the data processing hardware 113, a hard microphone closing event 125 at the user device 102. The hard microphone closing event 125 prevents the user device 102 from capturing any audio subsequent to the freeze word 123.

Figure 4:
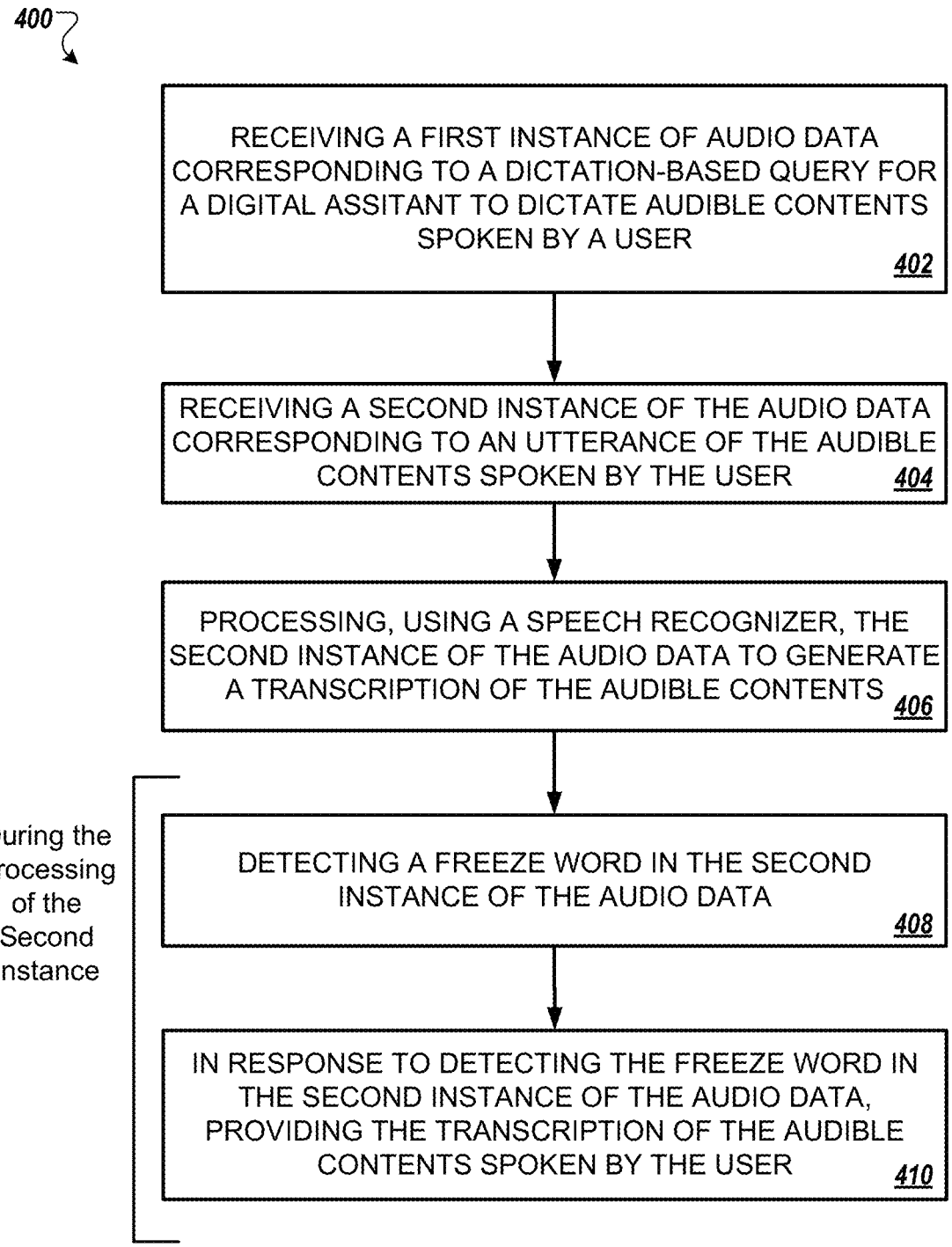
FIG. 4 is a flowchart of an example arrangement of operations for a method of detecting a freeze word in an utterance.

FIG. 4 is a flowchart of an exemplary arrangement of operations for a method 400 for detecting freeze words. At operation 402, the method 400 includes receiving, at data processing hardware 113, a first instance 119a of audio data 120 that corresponds to a dictation-based query 122 for a digital assistant 109 to dictate audible contents 124 spoken by a user 10. The dictation-based query 122 is spoken by the user 10 and captured by an assistant-enabled device (AED) 102 associated with the user 10. At operation 404, the method 400 includes receiving, at the data processing hardware 113, a second instance 120b of the audio data 120 that corresponds to an utterance 119 of the audible contents 124 spoken by the user 10 and captured by the assistant-enabled device 102. At operation 406, the method 400 includes processing, by the data processing hardware 113, using a speech recognizer 200, the second instance 120b of the audio data 120 to generate a transcription 225 of the audible contents 124.

At operation 408, during the processing of the second instance 120b of the audio data 120, the method 400 includes detecting, by the data processing hardware 113, a freeze word 123 in the second instance 120b of the audio data 120. The freeze word 123 follows the audible contents 124 in the utterance 119 spoken by the user 10 and captured by the assistant-enabled device 102. At operation 410, in response to detecting the freeze word 123 in the second instance 120b of the audio data 120, the method 400 includes providing, by the data processing hardware 113, for output 250 from the assistant-enabled device 102, the transcription 225 of the audible contents 124 spoken by the user 10.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
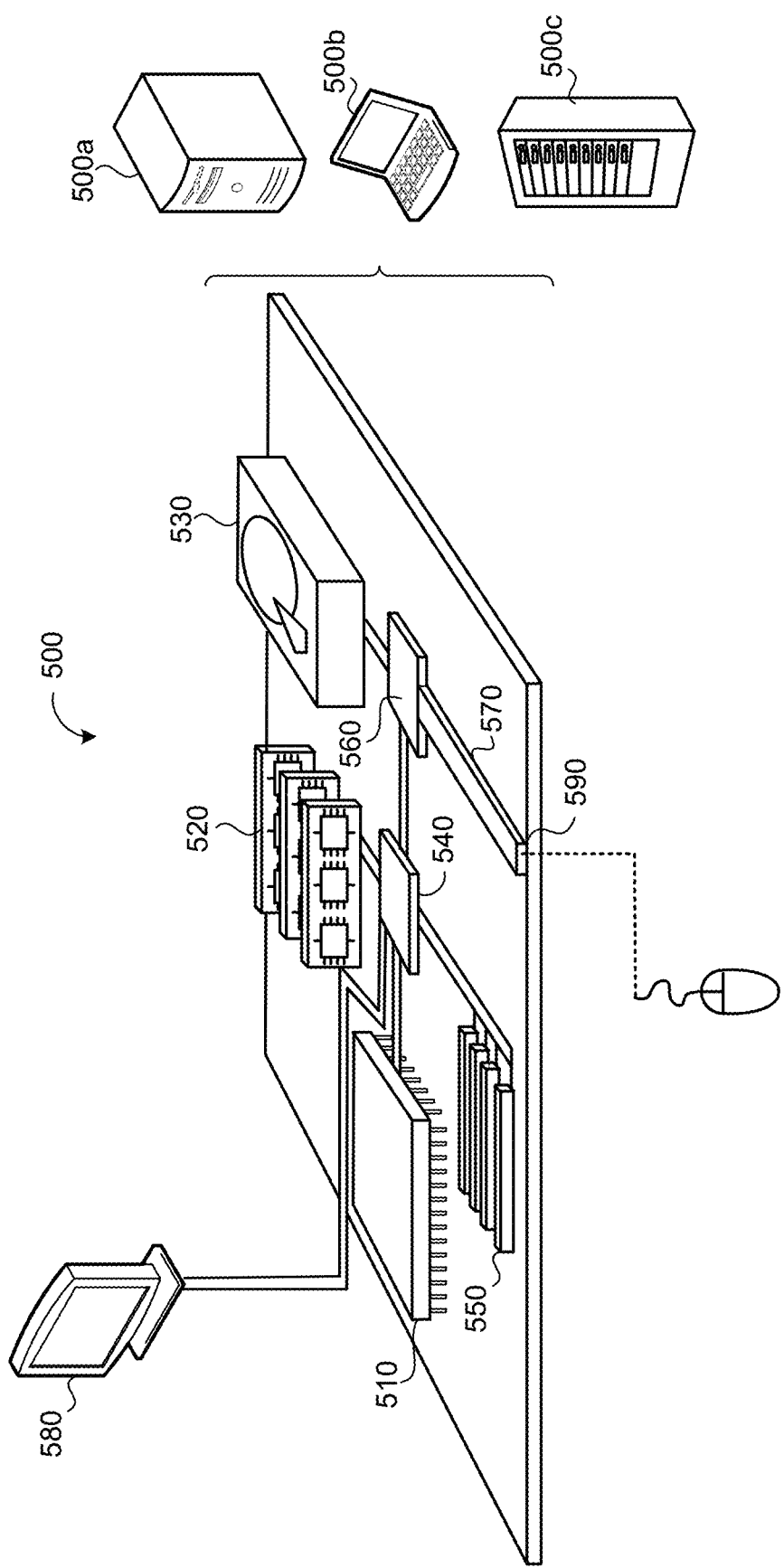
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for detecting freeze words, the method comprising:
   receiving, at data processing hardware, audio data corresponding to an utterance spoken by a user and captured by a user device associated with the user;
   processing, by the data processing hardware, using a speech recognizer, the audio data to determine that the utterance includes a query for a digital assistant to perform an operation, wherein the speech recognizer is configured to trigger endpointing of the utterance after a predetermined duration of non-speech in the audio data; and
   before the predetermined duration of non-speech in the audio data:
      detecting, by the data processing hardware, a freeze word in the audio data, the freeze word following the query in the utterance spoken by the user and captured by the user device; and
      in response to detecting the freeze word in the audio data:
         triggering, by the data processing hardware, a hard microphone closing event at the user device to prevent the user device from capturing any further audio data for the utterance subsequent to the freeze word;
         modifying, by the data processing hardware, a speech recognition result for the audio data by stripping the freeze word from the speech recognition result; and
         providing, by the data processing hardware, for output from the user device, the speech recognition result.

2. The method of claim 1, wherein the freeze word comprises one of:
   a predefined freeze word comprising one or more fixed terms across all users in a given language;

a user-selected freeze word comprising one or more terms specified by the user of the user device; or an action-specific freeze word associated with the operation to be performed by the digital assistant.

3. The method of claim 1, wherein detecting the freeze word in the audio data comprises:

extracting audio features from the audio data;

generating, using a freeze word detection model, a freeze word confidence score by processing the extracted audio features, the freeze word detection model executing on the data processing hardware; and determining that the audio data corresponding to the utterance includes the freeze word when the freeze word confidence score satisfies a freeze word confidence threshold.

4. The method of claim 1, wherein detecting the freeze word in the audio data comprises recognizing, using the speech recognizer executing on the data processing hardware, the freeze word in the audio data.

5. The method of claim 1, further comprising, in response to detecting the freeze word in the audio data:

instructing, by the data processing hardware, the speech recognizer to cease any active processing on the audio data; and instructing, by the data processing hardware, the digital assistant to fulfill performance of the operation.

6. The method of claim 1, wherein processing the audio data to determine that the utterance includes the query for the digital assistant to perform the operation comprises:

processing, using the speech recognizer, the audio data to generate a speech recognition result for the audio data; and performing semantic interpretation on the speech recognition result for the audio data to determine that the audio data includes the query to perform the operation.

7. The method of claim 6, further comprising, in response to detecting the freeze word in the audio data instructing, by the data processing hardware, using the speech recognition result, the digital assistant to perform the operation requested by the query.

8. The method of claim 1, further comprising, prior to processing the audio data using the speech recognizer:

detecting, by the data processing hardware, using a hotword detection model, a hotword in the audio data that precedes the query; and in response to detecting the hotword, triggering, by the data processing hardware, the speech recognizer to process the audio data by performing speech recognition on the hotword and/or one or more terms following the hotword in the audio data.

9. The method of claim 8, further comprising verifying, by the data processing hardware, a presence of the hotword detected by the hotword detection model based on detecting the freeze word in the audio data.

10. The method of claim 8, wherein:

detecting the freeze word in the audio data comprises executing a freeze word detection model on the data processing hardware that is configured to detect the freeze word in the audio data without performing speech recognition on the audio data; and the freeze word detection model and the hotword detection model each comprise the same or different neural network-based models.

11. A method for detecting a freeze word, the method comprising:

receiving, at data processing hardware, a first instance of audio data corresponding to a dictation-based query for a digital assistant to dictate audible contents spoken by a user, the dictation-based query spoken by the user and captured by an assistant-enabled device associated with the user;

receiving, at the data processing hardware, a second instance of the audio data corresponding to an utterance of the audible contents spoken by the user and captured by the assistant-enabled device;

processing, by the data processing hardware, using a speech recognizer, the second instance of the audio data to generate a transcription of the audible contents; and during the processing of the second instance of the audio data:

detecting, by the data processing hardware, a freeze word in the second instance of the audio data, the freeze word following the audible contents in the utterance spoken by the user and captured by the assistant-enabled device; and in response to detecting the freeze word in the second instance of the audio data:

stripping, by the data processing hardware, the freeze word from an end of the transcription of the audible contents spoken by the user; and providing, by the data processing hardware, for output from the assistant-enabled device, the transcription of the audible contents spoken by the user.

12. The method of claim 11, further comprising, in response to detecting the freeze word in the second instance of the audio data:

initiating, by the data processing hardware, a hard microphone closing event at the assistant-enabled device to prevent the assistant-enabled device from capturing any further audio for the utterance subsequent to the freeze word; and ceasing, by the data processing hardware, any active processing on the second instance of the audio data.

13. The method of claim 11, further comprising:

processing, by the data processing hardware, using the speech recognizer, the first instance of the audio data to generate a speech recognition result; and performing, by the data processing hardware, semantic interpretation on the speech recognition result for the first instance of the audio data to determine that the first instance of the audio data comprises the dictation-based query to dictate the audible contents spoken by the user.

14. The method of claim 13, further comprising, prior to initiating processing on the second instance of the audio data to generate the transcription:

determining, by the data processing hardware, that the dictation-based query specifies the freeze word based on the semantic interpretation performed on the speech recognition result for the first instance of the audio data; and instructing, by the data processing hardware, an endpointer to increase an endpointing timeout duration for endpointing the utterance of the audible contents.

15. A system comprising:

data processing hardware; and memory hardware in communication with the data processing hardware, the memory hardware storing instructions that when executed on the data processing hardware cause the data processing hardware to perform operations comprising:

receiving audio data corresponding to an utterance spoken by a user and captured by a user device associated with the user;

processing, using a speech recognizer, the audio data to determine that the utterance includes a query for a digital assistant to perform an operation, wherein the speech recognizer is configured to trigger endpointing of the utterance after a predetermined duration of non-speech in the audio data; and before the predetermined duration of non-speech in the audio data:

detecting a freeze word in the audio data, the freeze word following the query in the utterance spoken by the user and captured by the user device; and in response to detecting the freeze word in the audio data;

triggering a hard microphone closing event at the user device to prevent the user device from capturing any further audio data for the utterance subsequent to the freeze word;

modifying, by the data processing hardware, a speech recognition result for the audio data by stripping the freeze word from the speech recognition result; and providing, for output by the user device, the speech recognition result.

16. The system of claim 15, wherein the freeze word comprises one of:

a predefined freeze word comprising one or more fixed terms across all users in a given language;

a user-selected freeze word comprising one or more terms specified by the user of the user device; or an action-specific freeze word associated with the operation to be performed by the digital assistant.

17. The system of claim 15, wherein detecting the freeze word in the audio data comprises:

extracting audio features from the audio data;

generating, using a freeze word detection model, a freeze word confidence score by processing the extracted audio features, the freeze word detection model executing on the data processing hardware; and determining that the audio data corresponding to the utterance includes the freeze word when the freeze word confidence score satisfies a freeze word confidence threshold.

18. The system of claim 15, wherein detecting the freeze word in the audio data comprises recognizing, using the speech recognizer executing on the data processing hardware, the freeze word in the audio data.

19. The system of claim 15, wherein the operations further comprise, in response to detecting the freeze word in the audio data:

instructing the speech recognizer to cease any active processing on the audio data; and instructing the digital assistant to fulfill performance of the operation.

20. The system of claim 15, wherein processing the audio data to determine that the utterance includes the query for the digital assistant to perform the operation comprises:

processing, using the speech recognizer, the audio data to generate a speech recognition result for the audio data; and performing semantic interpretation on the speech recognition result for the audio data to determine that the audio data includes the query to perform the operation.

21. The system of claim 20, wherein the operations further comprise, in response to detecting the freeze word in the audio data instructing, using the speech recognition result, the digital assistant to perform the operation requested by the query.

22. The system of claim 15, wherein the operations further comprise, prior to processing the audio data using the speech recognizer:

detecting, using a hotword detection model, a hotword in the audio data that precedes the query; and in response to detecting the hotword, triggering the speech recognizer to process the audio data by performing speech recognition on the hotword and/or one or more terms following the hotword in the audio data.

23. The system of claim 22, wherein the operations further comprise verifying a presence of the hotword detected by the hotword detection model based on detecting the freeze word in the audio data.

24. The system of claim 22, wherein:

detecting the freeze word in the audio data comprises executing a freeze word detection model on the data processing hardware that is configured to detect the freeze word in the audio data without performing speech recognition on the audio data; and the freeze word detection model and the hotword detection model each comprise the same or different neural network-based models.

25. A system comprising:

data processing hardware; and memory hardware in communication with the data processing hardware, the memory hardware storing instructions that when executed on the data processing hardware cause the data processing hardware to perform operations comprising:

receiving a first instance of audio data corresponding to a dictation-based query for a digital assistant to dictate audible contents spoken by a user, the dictation-based query spoken by the user and captured by an assistant-enabled device associated with the user;

receiving a second instance of the audio data corresponding to an utterance of the audible contents spoken by the user and captured by the assistant-enabled device;

processing, using a speech recognizer, the second instance of the audio data to generate a transcription of the audible contents; and during the processing of the second instance of the audio data:

detecting a freeze word in the second instance of the audio data, the freeze word following the audible contents in the utterance spoken by the user and captured by the assistant-enabled device; and in response to detecting the freeze word in the second instance of the audio data:

stripping, by the data processing hardware, the freeze word from an end of the transcription of the audible contents spoken by the user; and providing, for output from the assistant-enabled device, the transcription of the audible contents spoken by the user.

26. The system of claim 25, wherein the operations further comprise, in response detecting the freeze word in the second instance of the audio data:

initiating a hard microphone closing event at the assistant-enabled device to prevent the assistant-enabled device from capturing any further audio for the utterance subsequent to the freeze word; and ceasing any active processing on the second instance of the audio data.

27. The system of claim 25, wherein the operations further comprise:
- processing, using the speech recognizer, the first instance of the audio data to generate a speech recognition result; and
- performing semantic interpretation on the speech recognition result for the first instance of the audio data to determine that the first instance of the audio data comprises the dictation-based query to dictate the audible contents spoken by the user.

28. The system of claim 27, wherein the operations further comprise, prior to initiating processing on the second instance of the audio data to generate the transcription:
- determining that the dictation-based query specifies the freeze word based on the semantic interpretation performed on the speech recognition result for the first instance of the audio data; and
- instructing an endpointer to increase an endpointing timeout duration for endpointing the utterance of the audible contents.

* * * * *